(12) United States Patent
Matos et al.

(10) Patent No.: US 12,423,328 B2
(45) Date of Patent: Sep. 23, 2025

(54) SYSTEMS, METHODS, AND APPARATUSES FOR AUTOMATICALLY CLASSIFYING DATA BASED ON DATA USAGE AND ACCESSING PATTERNS IN AN ELECTRONIC NETWORK

(71) Applicant: BANK OF AMERICA CORPORATION, Charlotte, NC (US)

(72) Inventors: Marcus Raphael Matos, Richardson, TX (US); Richard Scot, Huntersville, NC (US); Daniel Joseph Serna, The Colony, TX (US); Matthew K. Bryant, Gastonia, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 106 days.

(21) Appl. No.: 18/071,227

(22) Filed: Nov. 29, 2022

(65) Prior Publication Data
US 2024/0176804 A1 May 30, 2024

(51) Int. Cl.
*G06F 16/28* (2019.01)
(52) U.S. Cl.
CPC ................... *G06F 16/285* (2019.01)
(58) Field of Classification Search
None
See application file for complete search history.

(56) References Cited

U.S. PATENT DOCUMENTS

| | | | |
|---|---|---|---|
| 4,686,620 A | 8/1987 | Ng | |
| 8,577,913 B1 * | 11/2013 | Hansson | G06F 16/9535 707/767 |
| 9,229,945 B2 | 1/2016 | Horn | |
| 9,262,449 B2 | 2/2016 | Amarendran | |
| 9,268,766 B2 | 2/2016 | Bekkerman | |
| 9,311,609 B2 | 4/2016 | Marcheret | |
| 9,680,919 B2 | 6/2017 | Mcdaid | |
| 9,740,979 B2 | 8/2017 | Dubey | |
| 10,169,720 B2 | 1/2019 | Chien | |
| 10,402,748 B2 | 9/2019 | Virkar | |
| 10,546,245 B2 | 1/2020 | Virkar | |
| 10,671,750 B2 | 6/2020 | Parthasarathy | |

(Continued)

FOREIGN PATENT DOCUMENTS

| | | |
|---|---|---|
| CN | 106649455 A | 5/2017 |
| CN | 107656974 A | 2/2018 |

(Continued)

*Primary Examiner* — Yu Zhao
(74) *Attorney, Agent, or Firm* — Moore & Van Allen PLLC; Lauren M. Stokes

(57) ABSTRACT

Systems, computer program products, and methods are described herein for automatically classifying data based on data usage and accessing patterns in an electronic network. The present invention is configured to receive at least one query log comprising a plurality of data identifiers; generate a data identifier total based on each data identifier of the plurality of data identifiers; determine a data classification for each data identifier based on the data identifier total, wherein the data classification comprises at least one of an important classification or an unimportant classification; and generate a data catalogue comprising at least one data identifier associated with the important classification.

19 Claims, 9 Drawing Sheets

(56) References Cited

U.S. PATENT DOCUMENTS

| | | | |
|---|---|---|---|
| 10,855,604 B2 | 12/2020 | Tigli | |
| 11,256,724 B2 | 2/2022 | Lunde | |
| 11,468,098 B2 | 10/2022 | Chan | |
| 11,630,829 B1 * | 4/2023 | Thunuguntla | G06F 16/24575 707/723 |
| 2007/0254274 A1 * | 11/2007 | Graham | G06Q 10/00 434/322 |
| 2012/0179465 A1 * | 7/2012 | Cox | G10L 15/26 704/235 |
| 2015/0289120 A1 * | 10/2015 | Harber | H04L 67/12 455/414.3 |
| 2016/0350408 A1 * | 12/2016 | Lim | G06F 16/3331 |
| 2019/0187688 A1 | 6/2019 | Cella | |
| 2021/0081452 A1 | 3/2021 | Mueller | |

FOREIGN PATENT DOCUMENTS

| | | |
|---|---|---|
| EP | 3591587 A1 | 1/2020 |
| KR | 102130750 B1 | 7/2020 |

\* cited by examiner

SYSTEMS, METHODS, AND APPARATUSES FOR AUTOMATICALLY CLASSIFYING DATA BASED ON DATA USAGE AND ACCESSING PATTERNS IN AN ELECTRONIC NETWORK

FIELD OF THE INVENTION

The present invention embraces a system for automatically classifying data based on data usage and accessing patterns in an electronic network.

BACKGROUND

Managers of electronic networks and databases storing and using different data have a harder time than ever tracking the data and determining the data's importance based on different factors. For instance, managers—and users associated with the managers—of data may wish to easily access to data, to easily transmit data, to easily model data, and to easily store data, but may have a difficult time making sure the most important data is readily accessible, the important data is catalogued correctly, the important data is modeled correctly, and the important data is stored correctly. A need, therefore, exists for a system to accurately, efficiently, and dynamically classify data based on usage and access patterns in an electronic network.

Applicant has identified a number of deficiencies and problems associated with automatically classifying data based on data usage and accessing patterns in an electronic network. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for automatically classifying data based on data usage and accessing patterns is provided. The system may comprise: a memory device with computer-readable program code stored thereon; at least one processing device operatively coupled to the at least one memory device and the at least one communication device, wherein executing the computer-readable code is configured to cause the at least one processing device to: receive at least one query log comprising a plurality of data identifiers; generate a data identifier total based on each data identifier of the plurality of data identifiers; determine a data classification for each data identifier based on the data identifier total, wherein the data classification comprises at least one of an important classification or an unimportant classification; and generate a data catalogue comprising at least one data identifier associated with the important classification.

In some embodiments, the processing device is further configured to: determine the data identifier total meets an importance threshold; and determine the data classification is the important classification, wherein data classification is based on the data identifier total meeting the importance threshold.

In some embodiments, the processing device is further configured to: generate a plurality of data identifier totals, wherein each data identifier total of the plurality of data identifiers is based on each data identifier of the plurality of data identifiers; compare the plurality of data identifier totals; generate, based on comparing the plurality of data identifier totals, a data identifier total ranking; and determine the data classification is the important classification based on the data identifier total ranking, wherein the important classification is associated with at least one data identifier comprising a highest data identifier total ranking.

In some embodiments, the processing device is further configured to: generate a small data classification for a plurality of data identifiers based on the importance classification of the plurality of data identifiers; and generate a small data database comprising data associated with the plurality of data identifiers associated with the small data classification.

In some embodiments, the processing device is further configured to: determine, based on the query log, a source identifier for each data identifier of the plurality of data identifiers; determine, based on the query log, a target identifier for each data identifier of the plurality of data identifiers, wherein the target identifier comprises a target destination associated with the data identifier; determine whether the source identifier and the target identifier are different for each data identifier; and generate, in an instance where the source identifier and target identifier are different, the important classification for the data identifier. In some embodiments, the processing device is further configured to determine, based on the important classification for the data identifier, the important classification comprises a wide data classification, wherein the wide data classification is based on the determination the source identifier and the target identifier are different. In some embodiments, the processing device is further configured to generate a wide data database comprising data associated with a plurality of data identifiers associated with the wide data classification.

In some embodiments, the processing device is further configured to: generate a previous data identifier frequency for each data identifier based on a plurality of previous query logs comprising at least one data identifier, wherein the previous data identifier frequency comprises a previous time period; determine, based on the previous data identifier frequency, a previous data classification for the at least one data identifier; generate a current data identifier frequency based on at least one current query log comprising the at least one data identifier, wherein the current data identifier frequency comprises a current time period; and determine, based on the current data identifier frequency, a current data classification for the at least one data identifier. In some embodiments, the processing device is further configured to: determine the previous data classification and the current data classification comprise a plurality of different data classification types; and generate, based on the previous data classification and the current data classification being different, a classification alert for the at least one data identifier. In some embodiments, the processing device is further configured to determine the previous data classification and the current data classification comprise a same data classification type.

In another aspect, a computer program product for automatically classifying data based on data usage and accessing patterns is provided. In some embodiments, the computer program product may comprise at least one non-transitory computer-readable medium having computer-readable program code portions embodied therein, the computer-readable program code portions which when executed by a processing device are configured to cause the processor to: receive at least one query log comprising a plurality of data identifiers; generate a data identifier total based on each data identifier of the plurality of data identifiers; determine a data classification for each data identifier based on the data identifier total, wherein the data classification comprises at least one of an important classification or an unimportant classification; and generate a data catalogue comprising at least one data identifier associated with the important classification.

In some embodiments, the processing device is further configured to cause the processor to: generate a plurality of data identifier totals, wherein each data identifier total of the plurality of data identifiers is based on each data identifier of the plurality of data identifiers; compare the plurality of data identifier totals; generate, based on comparing the plurality of data identifier totals, a data identifier total ranking; and determine the data classification is the important classification based on the data identifier total ranking, wherein the important classification is associated with at least one data identifier comprising a highest data identifier total ranking.

In some embodiments, the processing device is further configured to cause the processor to: generating a small data classification for a plurality of data identifiers based on the important classification of the plurality of data identifiers; and generating a small data database comprising data associated with the plurality of data identifiers associated with the small data classification.

In some embodiments, the processing device is further configured to cause the processor to: determine, based on the query log, a source identifier for each data identifier of the plurality of data identifiers; determine, based on the query log, a target identifier for each data identifier of the plurality of data identifiers, wherein the target identifier comprises a target destination associated with the data identifier; determine whether the source identifier and the target identifier are different for each data identifier; and generate, in an instance where the source identifier and target identifier are different, the important classification for the data identifier. In some embodiments, the processing device is further configured to determine, based on the important classification for the data identifier, the important classification comprises a wide data classification, wherein the wide data classification is based on the determination the source identifier and the target identifier are different.

In another aspect, a computer-implemented method for automatically classifying data based on data usage and accessing patterns is provided. In some embodiments, the computer-implemented method comprises: receiving at least one query log comprising a plurality of data identifiers; generating a data identifier total based on each data identifier of the plurality of data identifiers; determining a data classification for each data identifier based on the data identifier total, wherein the data classification comprises at least one of an important classification or an unimportant classification; and generating a data catalogue comprising at least one data identifier associated with the important classification.

In some embodiments, the computer-implemented method may further comprise: generating a plurality of data identifier totals, wherein each data identifier total of the plurality of data identifiers is based on each data identifier of the plurality of data identifiers; comparing the plurality of data identifier totals; generating, based on comparing the plurality of data identifier totals, a data identifier total ranking; and determining the data classification is the important classification based on the data identifier total ranking, wherein the important classification is associated with at least one data identifier comprising a highest data identifier total ranking.

In some embodiments, the computer-implemented method may further comprise: generating a small data classification for a plurality of data identifiers based on the important classification of the plurality of data identifiers; and generating a small data database comprising data associated with the plurality of data identifiers associated with the small data classification. In In some embodiments, the computer-implemented method may further comprise: generating a plurality of data identifier totals, wherein each data identifier total of the plurality of data identifiers is based on each data identifier of the plurality of data identifiers; comparing the plurality of data identifier totals; generating, based on comparing the plurality of data identifier totals, a data identifier total ranking; and determining the data classification is the important classification based on the data identifier total ranking, wherein the important classification is associated with at least one data identifier comprising a highest data identifier total ranking.

In some embodiments, the computer-implemented method may further comprise: generating a small data classification for a plurality of data identifiers based on the important classification of the plurality of data identifiers; and generating a small data database comprising data associated with the plurality of data identifiers associated with the small data classification.

In some embodiments, the computer-implemented method may further comprise: determining, based on the query log, a source identifier for each data identifier of the plurality of data identifiers; determining, based on the query log, a target identifier for each data identifier of the plurality of data identifiers, wherein the target identifier comprises a target destination associated with the data identifier; determining whether the source identifier and the target identifier are different for each data identifier; and generating, in an instance where the source identifier and target identifier are different, the important classification for the data identifier. In some embodiments, the computer-implemented method may further comprise determining, based on the important classification for the data identifier, the important classification comprises a wide data classification, wherein the wide data classification is based on the determination the source identifier and the target identifier are different.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
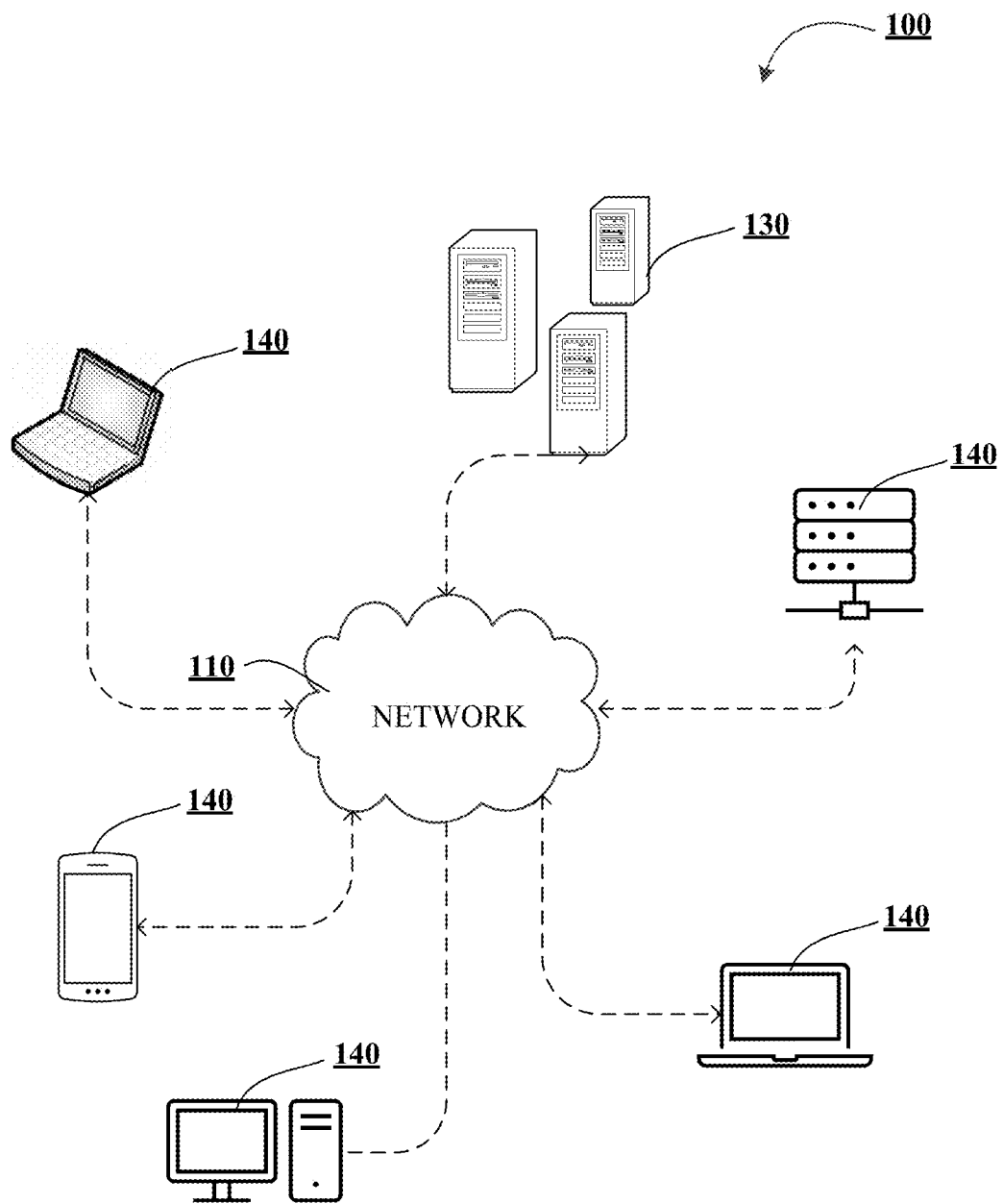
Figure 1B:
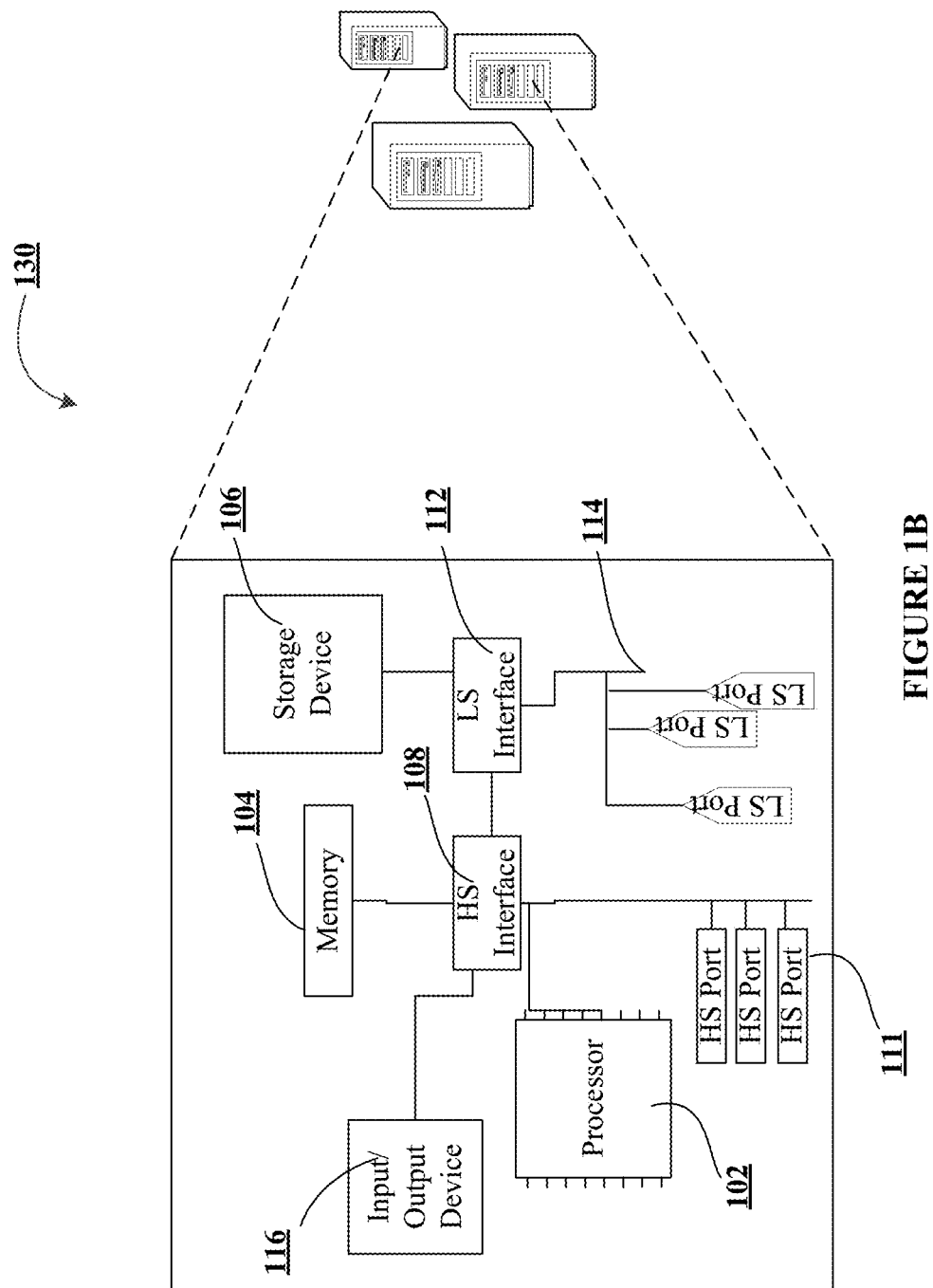
Figure 1C:
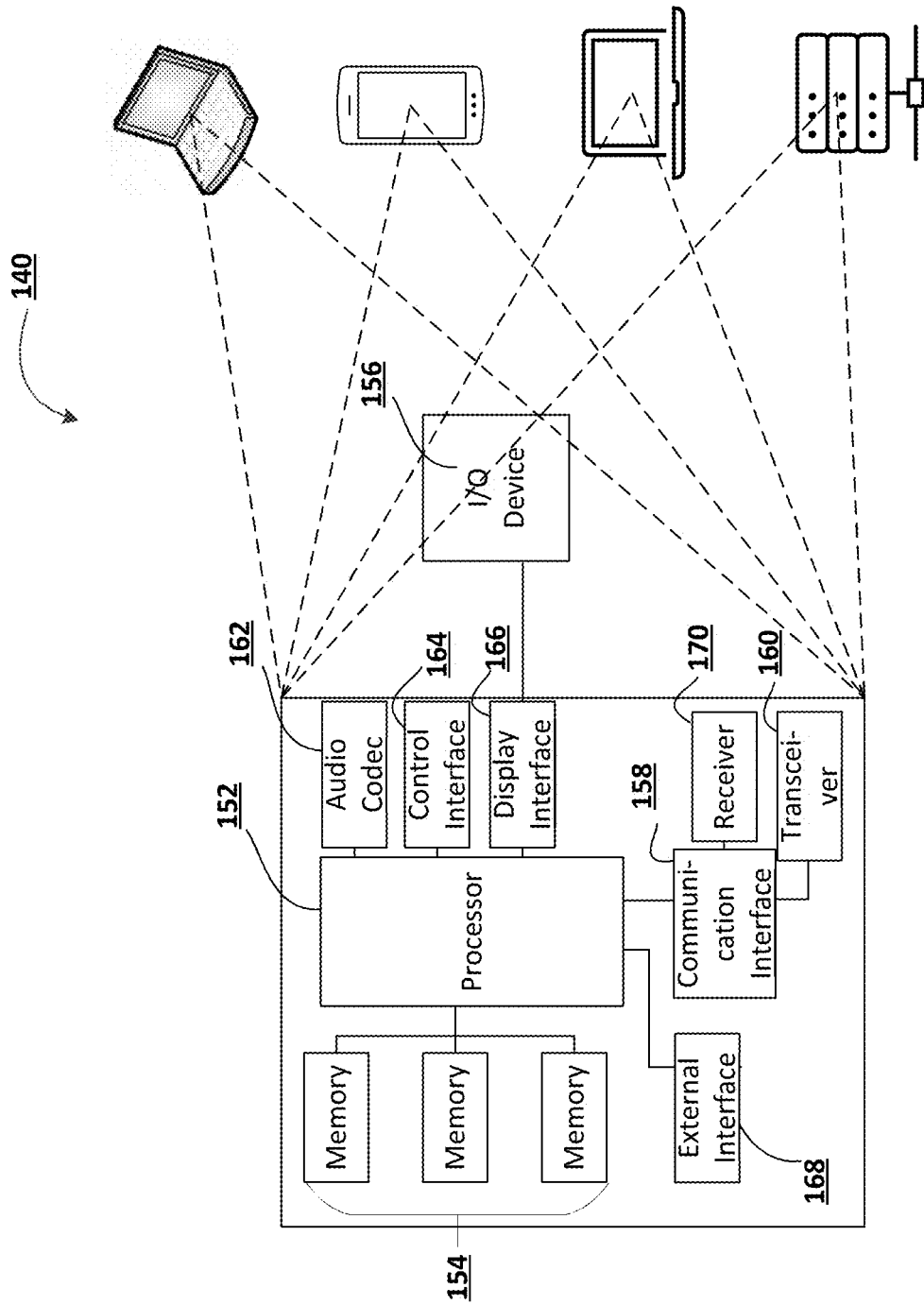
Figure 2:
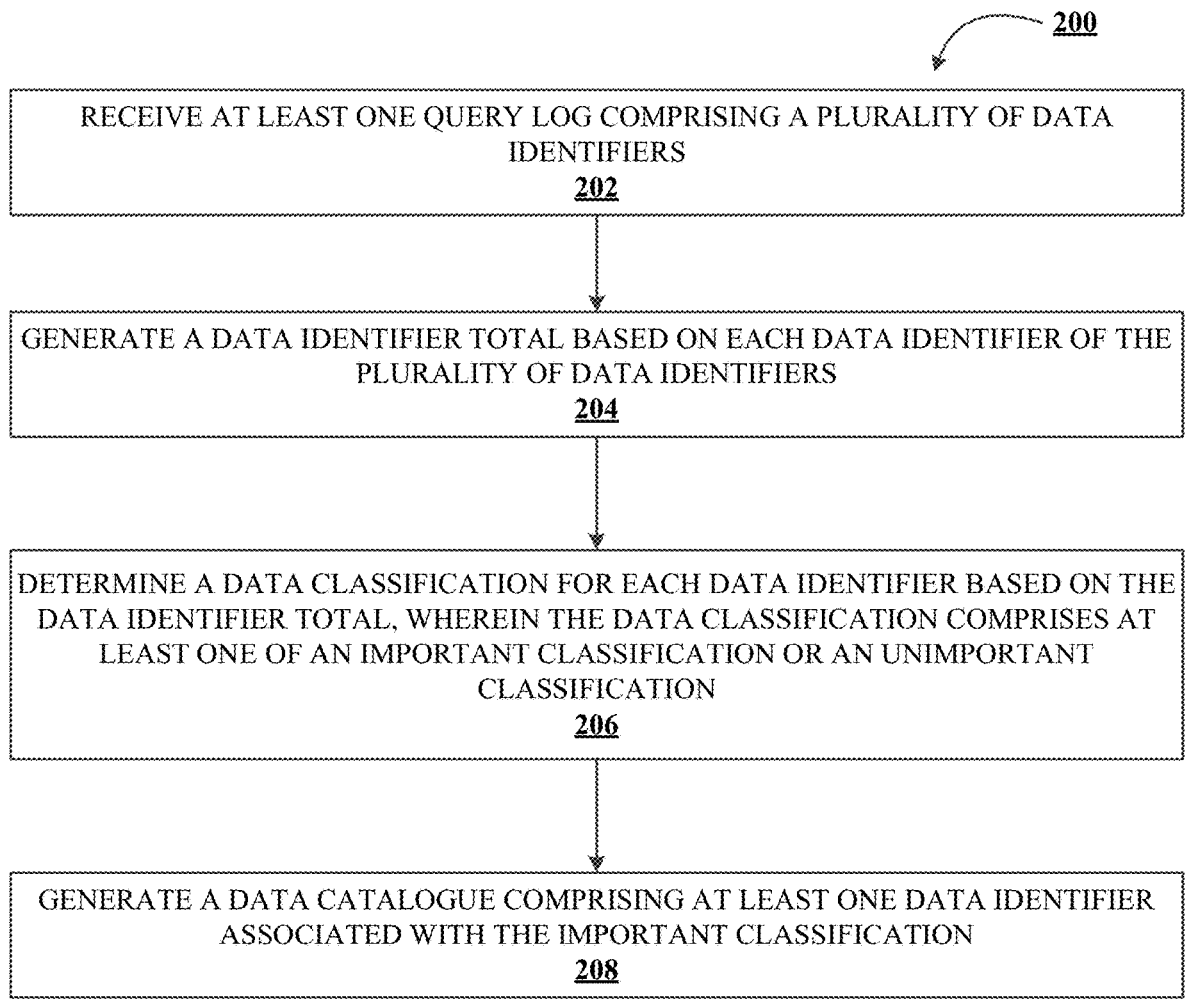
Figure 3:
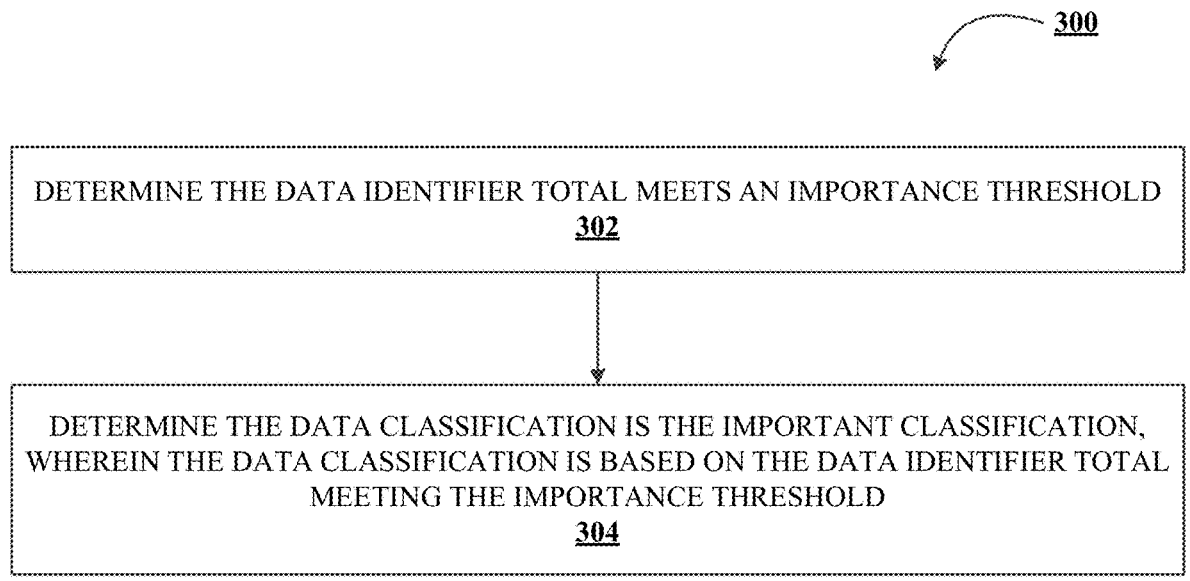
Figure 4:
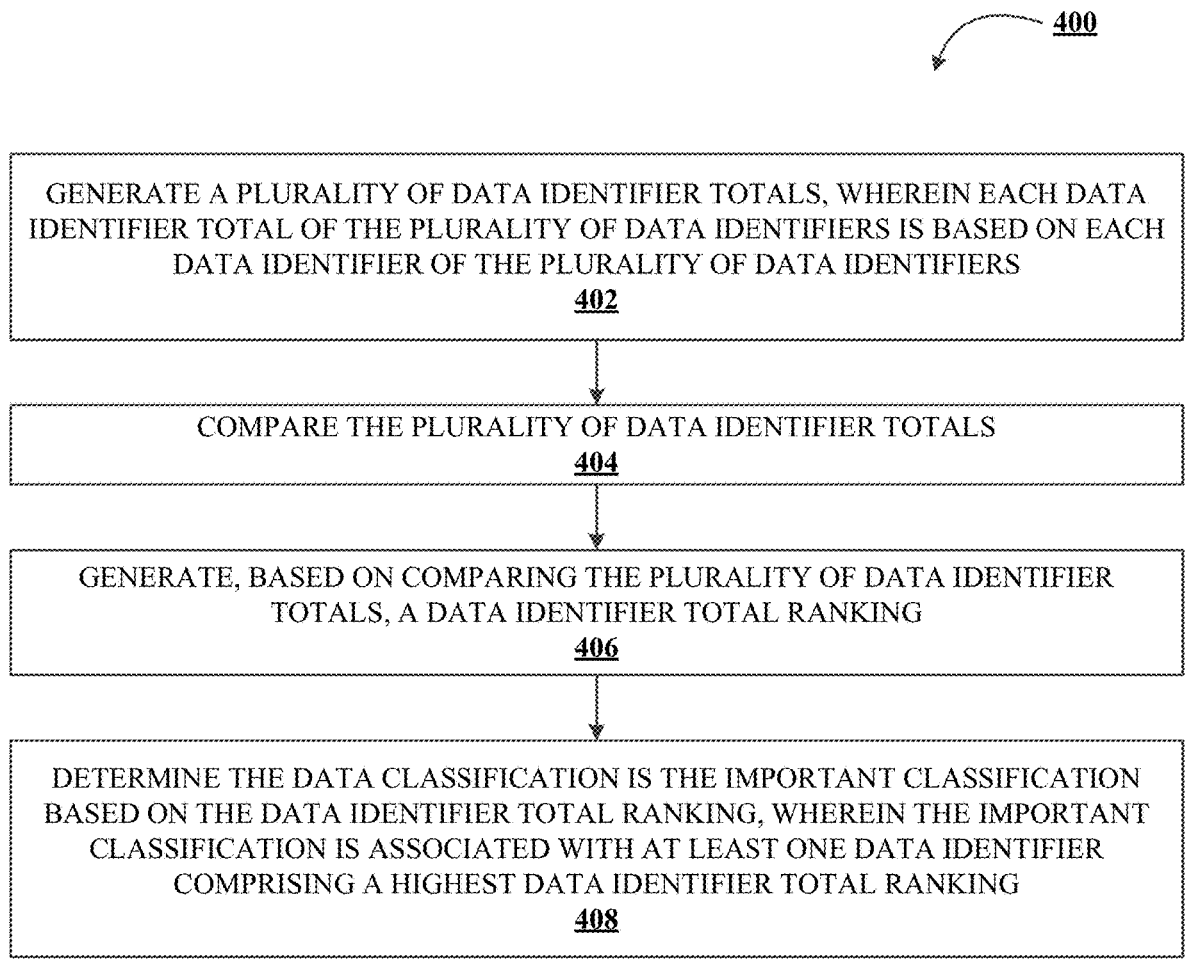
Figure 5:
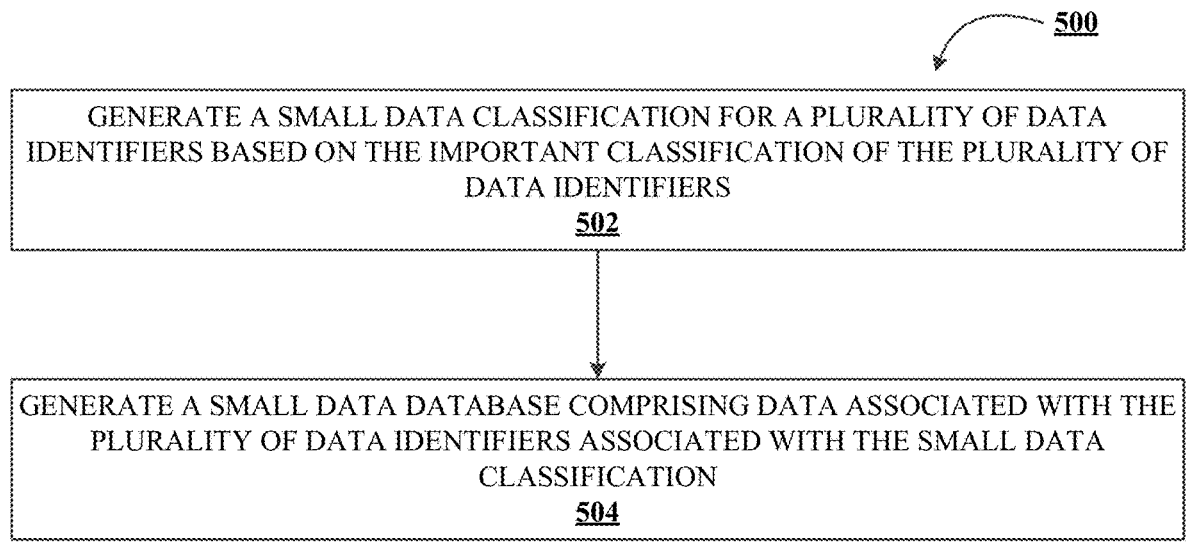
Figure 6:
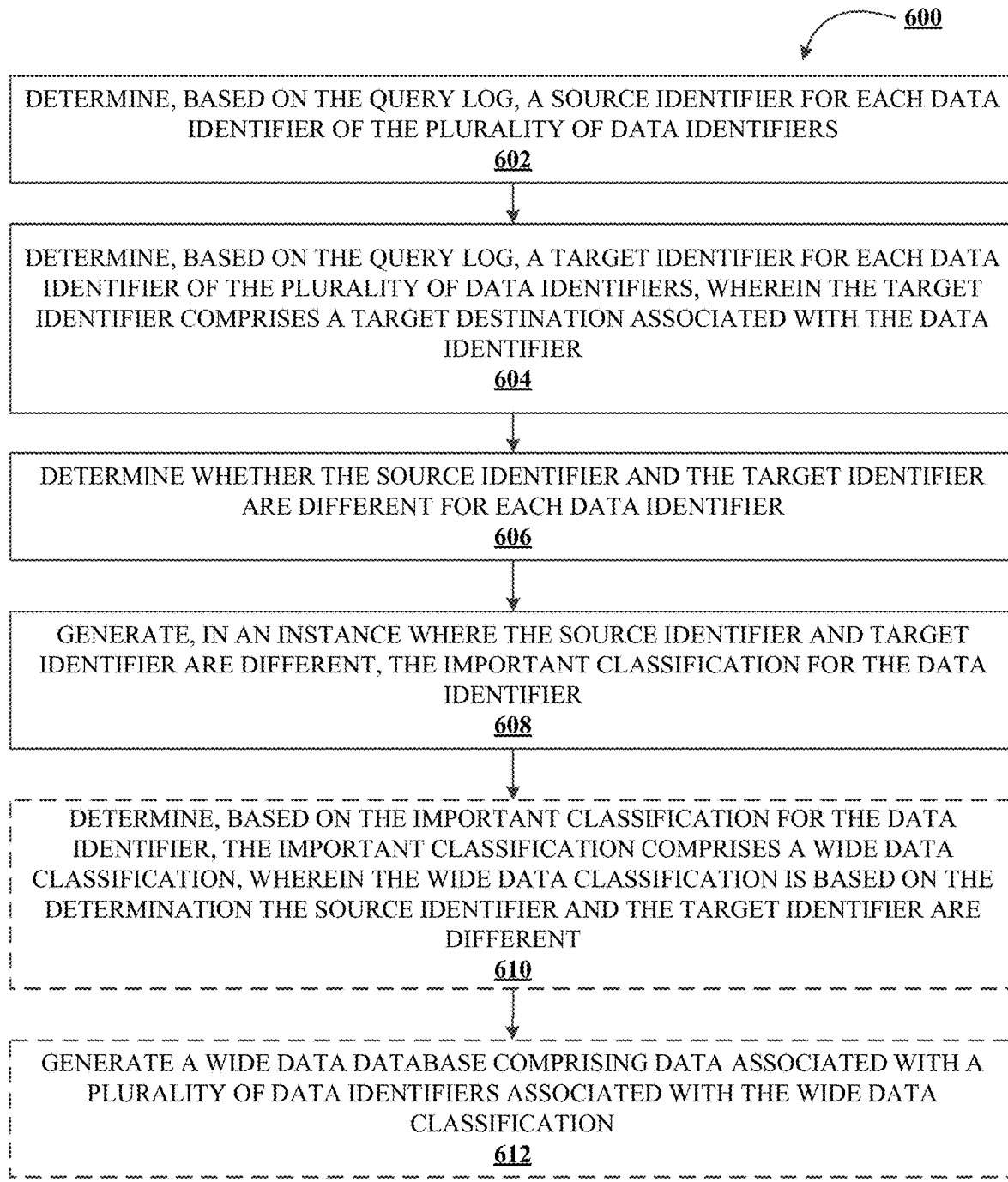
Figure 7:
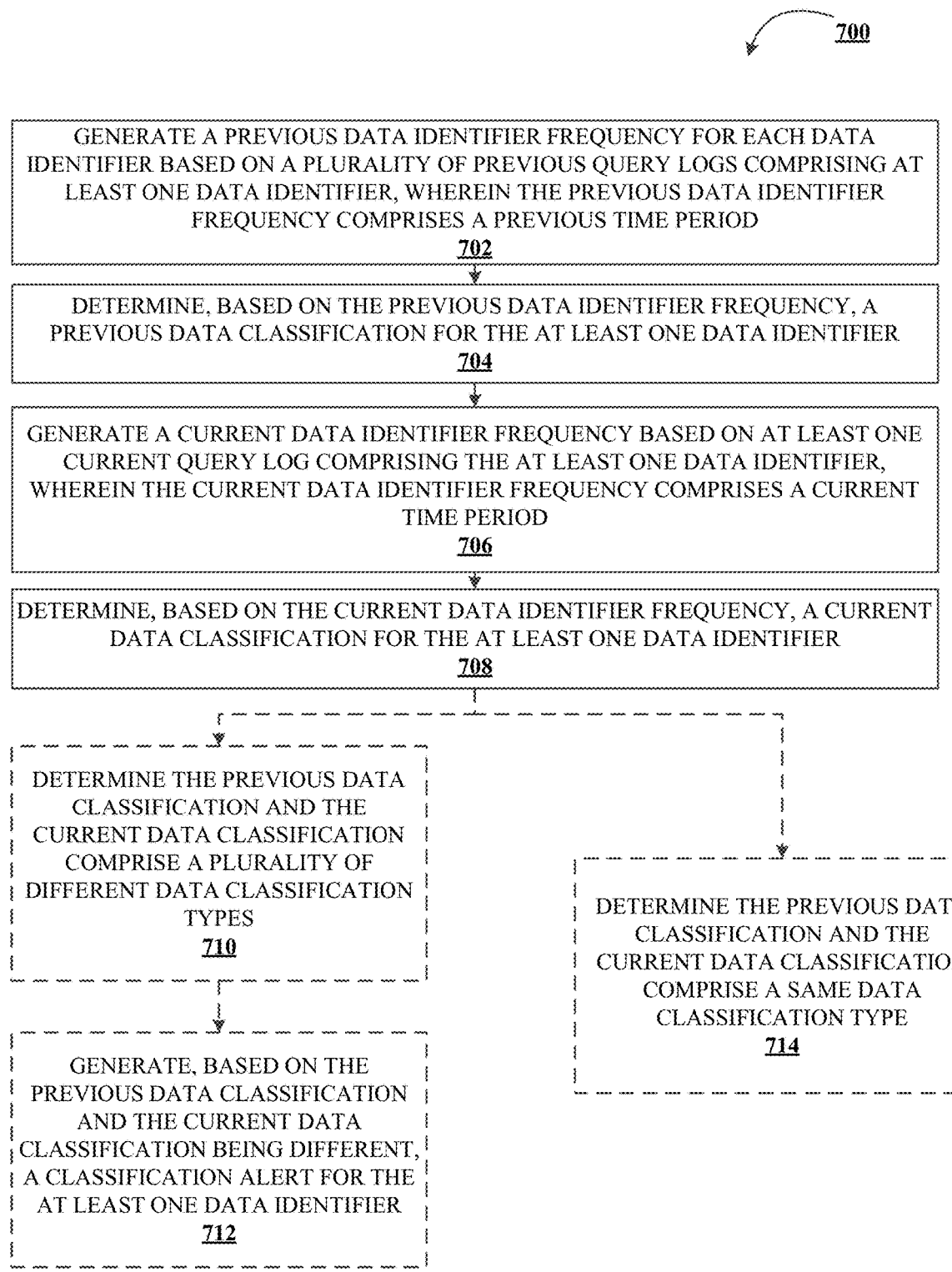

Having thus described embodiments of the invention in general terms, reference will now be made the accompanying drawings, wherein:

FIGS. 1A-1C illustrates technical components of an exemplary distributed computing environment automatically classifying data based on data usage and accessing patterns in an electronic network, in accordance with an embodiment of the invention;

FIG. 2 illustrates a process flow for automatically classifying data based on data usage and accessing patterns in an electronic network, in accordance with an embodiment of the invention;

FIG. 3 illustrates a process flow for determining the data classification for each data identifier based on a data identifier total, in accordance with an embodiment of the invention;

FIG. 4 illustrates a process flow for determining the data classification based on a data identifier total ranking, in accordance with an embodiment of the invention;

FIG. 5 illustrates a process flow for generating a small data database comprising data associated with a small data classification, in accordance with an embodiment of the invention;

FIG. 6 illustrates a process flow for generating a wide data database comprising data associated with a wide data classification, in accordance with an embodiment of the invention; and FIG. 7 illustrates a process flow for determining a current data classification and a previous data classification, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As described in further detail herein, the present invention provides a solution to the above-referenced problems in the field of technology by generating an accurate, efficient, and dynamic data classification system for classifying data based on usage and access patterns in an electronic network. Such a system (i.e., a data classification system) solves at least the technical problems in accurately, efficiently, and dynamically classifying data, storing data, and/or cataloguing data based on the usage patterns and accessing patterns of the data by user accounts. The present invention solves the above-identified technical problems by implementing the data classification system, like that shown as system 130 in FIGS. 1A-1C. For instance, the data classification system acts to determine a data identifier total based on the number of times a data identifier appears in at least one query log over a specified period of time, determine the data classification based on the data identifier total, and generate a data catalogue comprising the data identifiers associated with each data classification, such as a data catalogue comprising the data associated with an important classification.

Accordingly, the present invention works by receiving at least one query log comprising a plurality of data identifiers; generating a data identifier total based on each data identifier of the plurality of data identifiers; determining a data classification for each data identifier based on the data identifier total, where the data classification comprises at least one of an important classification or an unimportant classification; and generating a data catalogue comprising at least one data identifier associated with the important classification.

What is more, the present invention provides a technical solution to a technical problem. As described herein, the technical problem includes the accurate, efficient, and dynamic data classification of data within an electronic network. The technical solution presented herein allows for a data classification system used for determining data classifications, generating data catalogues, and/or generating specific databases for each data classification based on the usage and access patterns of the data. In particular, the data classification system is an improvement over existing solutions to the accurate, efficient, and dynamic data classification of data, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for automatically classifying data based on data usage and accessing patterns in an electronic network 100, in accordance with an embodiment of the invention. As shown in FIG. 1A, the distributed computing environment 100 contemplated herein may include a system 130 (i.e., a data classification system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for automatically classifying data based on data usage and accessing patterns in an electronic network, in accordance with an embodiment of the invention. In some embodiments, a system (e.g., similar to one or more of the systems described herein with respect to FIGS. 1A-1C) may perform one or more of the steps of process flow 200. For example, a data classification system (e.g., the system 130 described herein with respect to FIG. 1A-1C) may perform the steps of process 200.

As shown in block 202, the process flow 200 may include the step of receiving at least one query log comprising a plurality of data identifiers. In some embodiments, the data classification system may receive at least one query log from a device 140 (e.g., a user device submitting a query request for data associated with the data classification system) associated with the data classification system (e.g., system 130 of FIGS. 1A-1C). Such a query log may comprise each of the query requests received from at least one user and/or a plurality of users associated with the data classification system. In some embodiments, the query log may comprise each of the query requests received from a plurality of users associated with a client of the data classification system (e.g., a plurality of users associated with a client such as a financial institution, a company, an entity, and/or the like), whereby the plurality of users may be requesting a certain type of data and/or specific data element stored within the client's databases. In some embodiments, each of the query requests received from a plurality of user devices may be collected and grouped into a query log based on the time period for which the query requests were received, such as a specified time period (e.g., 1 minute, 30 minutes, 1 hour, 12 hours, 24 hours, a week, a month, a year, and/or the like).

In some embodiments, the query log may comprise a plurality of rows and columns, where each row and column within the query log may comprise a specified data element used to generate the query request from the user. For instance, each query log may comprise the query request split up into a plurality of data elements and organized into the correct rows and columns. In some embodiments, a column of the query log may comprise a timestamp of the query request, where the timestamp may comprise a date, a time of day, and/or the like the query request was submitted and/or transmitted. In some embodiments, the query log may comprise a database for which the query request was submitted (e.g., a database comprising the data for which the query request was submitted to retrieve), a user account which submitted the query request, an account type of the user account which submitted the query request (e.g., user, manager, machine, and/or the like), a title of the data requested in the query request (e.g., a data identifier which is recognized by the data classification system for a specified piece of data), and/or the like.

In some embodiments, each query log may comprise a plurality of data identifiers split up between a plurality of rows and a plurality of columns, where each query log may comprise each data identifier associated with each query request from a specified time period and/or from a specified database. For instance, each query log may be limited to a specified time period (e.g., within a specified hour, within a specified 12 hours, within a specified 24 hours, and/or the like) which may be determined by the data classification system itself and/or determined by the client of the data classification system—such as the client associated with the user accounts submitting the query requests. In some embodiments, the query log(s) may be limited to the database identified in the query request, such that each query log comprises all of the query requests for each specified database identifier. In both instances, and as understood by a person of skill in the art, the data classification system may track each query request submitted by each of the user accounts to give a complete listing of each query request submitted no matter the data requested.

As shown in block 204, the process flow 200 may include the step of generating a data identifier total based on each data identifier of the plurality of data identifiers. In some embodiments, the data classification system may generate the data identifier total based on each of the data identifiers within each of the query logs. For instance, and as used herein, the data identifier total may comprise a total amount of how often each data identifier appears on the query log(s). For instance, if the data classification system receives a plurality of query logs from the same specified time period (e.g., the last 24 hours), the data classification system may count the amount of times each data identifier appears on the plurality of query logs in order to determine the data identifier total for each data identifier. In this manner, the data classification system may track the data identifier total for each data identifier over each period of time the data classification system has indicated (e.g., each period of 24 hours, each week, each month, each year, and/or the like).

As shown in block 206, the process flow 200 may include the step of determining a data classification for each data identifier based on the data identifier total, wherein the data classification comprises at least one of an important classification or an unimportant classification. In some embodiments, the data classification system may determine the data classification of each data identifier based on the data identifier total, where the data classification may comprise at least one of an important classification, an unimportant classification, a medium-important classification, and/or the like. Such a data classification may be determined using a variety of methods, each of which are described in further detail below. Specifically, FIGS. 3 and 4 describe at least two methods of determining the data classification for each data identifier.

As shown in block 208, the process flow 200 may include the step of generating a data catalogue comprising at least one data identifier associated with the important classification. In some embodiments, the data classification system may generate a data catalogue comprising at least the data identifiers associated with the important classification, such as those data identifiers that were determined by the data classification system to comprise an important classification. In this manner, the data classification system may generate at least one data catalogue comprising the data identifiers which are considered most important in the data classification system and which are considered most important for each client of the data classification system (e.g., the client using the data classification system to track important data identifiers).

In some embodiments, the data catalogue may be used to efficiently determine the location of the most important data within the data classification system and/or associated with the data classification system (e.g., comprised within a client's system which is using the data classification system for tracking important data). In some embodiments, the data catalogue may individually identify each data identifier that comprises an important classification, each data location within each database for each data identifier comprising the important classification, and/or the like. In this manner, the data classification system may quickly identify the location of storage for each data associated with each data identifier which may in turn allow the data classification system and/or the client of the data classification system to quickly call-up and/or retrieve the data, such as quickly calling up and retrieving important data. Such a data catalogue based on the data classification(s) may be dynamically updated upon each data's data classification's changes and/or updates. Thus, and in some embodiments, as data classifications for data changes within the data classification system, so will the data within each data catalogues comprising each data classification. In this manner, the data comprised within the data catalogues may be constantly updated.

In some embodiments, a data catalogue may comprise the unimportant data identifiers determined by the data classification system. For instance, the data classification system may organize all the data identifiers into each respective data catalogue based on each data identifier's associated data classification. By way of non-limiting example, and where a data identifier comprises an unimportant classification, the data classification system may generate an unimportant data catalogue and may add each data identifier comprising the unimportant classification to the unimportant data catalogue. In some embodiments, the data classification system may likewise add each data identifier comprising a medium-important classification to a medium-important data catalogue.

FIG. 3 illustrates a process flow 300 for determining the data classification for each data identifier based on a data identifier total, in accordance with an embodiment of the invention. In some embodiments, a system (e.g., similar to one or more of the systems described herein with respect to FIGS. 1A-1C) may perform one or more of the steps of process flow 300. For example, a data classification system (e.g., the system 130 described herein with respect to FIG. 1A-1C) may perform the steps of process flow 300.

As shown in block 302, the process flow 300 may include the step of determining the data identifier total meets an importance threshold. In some embodiments, the data classification system may determine the data identifier total meets an important threshold based on the amount a data identifier shows up in at least one query log. By way of non-limiting example, the data classification system may count and/or determine the amount a data identifier appears on at least one query log from the specified time period in order to determine the data identifier total. In some embodiments, such a data identifier total may be compared with an importance threshold, where such an importance threshold may be pre-determined by the data classification system itself, by a client of the data classification system, by a manager of the data classification system, and/or the like. The importance threshold, as referred to herein, may be used by the data classification system to determine whether data associated with a data identifier is important within a system (e.g., important to a client of the system, and/or the like), where the importance threshold may be pre-determined and used for comparison against the data identifier total. By way of non-limiting example, if the data identifier total meets or exceeds the importance threshold, the data classification system may determine the data associated with the data identifier total comprises an important classification.

In some embodiments, the importance threshold may be pre-determined based on previous data identifier totals and previous records of importance thresholds. For instance, the importance threshold may be updated as the data identifier totals for each data identifier increases as tracked by the data classification system and/or where the importance threshold increases over time. Thus, and by way of non-limiting example, the importance threshold may be increased over time as data identifier totals increase over time in order to prevent a large portion of data identifiers from comprising an important classification. In this manner, only a small ratio of data identifiers may comprise an important classification as compared to the totality of data identifiers determined in the query log(s).

As shown in block 304, the process flow 300 may include the step of determining the data classification is the important classification, wherein the data classification is based on the data identifier total meeting the importance threshold. In some embodiments, the data classification system may determine the data classification for a data identifier should be an important classification where the data identifier total for the data identifier meets or exceeds the importance threshold.

In some embodiments, there may be a medium-importance threshold which may be pre-determined by the data classification system itself, by a manager of the data classification system, and/or by a client of the data classification system. In some embodiments, if the data identifier total meets both the medium-important threshold and the importance threshold, the data classification system may determine the data classification for the data identifier to be an important classification. In some embodiments, and where the data identifier total meets a medium-important threshold but fails to meet the importance threshold, the data classification system may determine the data classification for the data identifier to be a medium-important classification. In some embodiments, and where the data identifier total does not meet the medium-important threshold and does not meet the importance threshold, the data classification system may determine the data classification for the data identifier to be an unimportant classification.

FIG. 4 illustrates a process flow 400 for determining the data classification based on a data identifier total ranking, in accordance with an embodiment of the invention. In some embodiments, a system (e.g., similar to one or more of the systems described herein with respect to FIGS. 1A-1C) may perform one or more of the steps of process flow 400. For example, a data classification system (e.g., the system 130 described herein with respect to FIG. 1A-1C) may perform the steps of process flow 400.

As shown in block 402, the process flow 400 may include the step of generating a plurality of data identifier totals, wherein each data identifier total of the plurality of data identifiers is based on each data identifier of the plurality of data identifiers. In some embodiments, the data classification system may generate the plurality of data identifier totals based on an amount of a data identifier showing up and/or being indicated in at least one query log from a specified time period. In some embodiments, the data identifier total may be generated based on a total amount of each data identifier as each identifier is indicated in each of the query logs from the specified time period (e.g., at least one query log of the specified time period and/or a plurality of query logs from the specified time period).

As shown in block 404, the process flow 400 may include the step of comparing the plurality of data identifier totals. In some embodiments, the data classification system may compare the plurality of data identifier totals, such that each data identifier total generated by the data classification system is compared to the other data identifier total(s) from the same specified time period. For instance, the data classification system may compare each of the data identifier totals from the specified time period in order to determine a ranking of the data identifier totals, whereby the greater the data total identifier, the higher in ranking the data identifier will be in the data identifier total ranking.

As shown in block 406, the process flow 400 may include the step of generating, based on comparing the plurality of data identifier totals, a data identifier total ranking. By way of example, the data classification system may rank each of the data identifiers in descending order based on the data identifier total for each data identifier. For instance, the greater in amount of the data identifier total, the higher rank for the associated data identifier in the data identifier total ranking.

In some embodiments, the data classification system may rank each of the data identifiers in ascending order based on the data identifier total for each data identifier, such that the great the amount of the data identifier total, the lower the rank for the associated data identifier in the data identifier total ranking.

By way of non-limiting example, the greater the data identifier total as determined by the data classification system, the more likely the associated data identifier will comprise or be associated with an important classification.

As shown in block 408, the process flow 400 may include the step of determining the data classification based on the data identifier total ranking, wherein the important classification is associated with at least one data identifier comprising a highest data identifier total ranking. In some embodiments, the data classification system may determine the data classification for each data identifier is at least one of an important classification, an unimportant classification, a medium-important classification, and/or the like. In some embodiments, the data classification system may determine a specified ratio and/or specified number of data identifiers will be determined to have a data classification of an important classification. In some embodiments, the data classification system may determine the ratio and/or specified number of data identifiers to have a data classification comprising an important classification based on a predetermined ratio and/or predetermined specified number from the manager of the data classification system, the client of the data classification system, and/or the like. Similarly, such a ratio and/or specified number of data identifiers may be used to determine (based on the ratio and/or specified number of important classifications for the data identifiers) the unimportant classification and/or medium-important classification. In this manner, the left-over data identifiers that do not comprise the important classification may be split up between the unimportant classification or medium-important classification. In some embodiments, the ratio of unimportant classification data identifiers and medium-important classification data identifiers may be even such that there is an even number of data identifier comprising both the unimportant classification and the medium-important classification.

FIG. 5 illustrates a process flow 500 for generating a small data database comprising data associated with a small data classification, in accordance with an embodiment of the invention. In some embodiments, a system (e.g., similar to one or more of the systems described herein with respect to FIGS. 1A-1C) may perform one or more of the steps of process flow 500. For example, a data classification system (e.g., the system 130 described herein with respect to FIG. 1A-1C) may perform the steps of process 500.

As shown in block 502, the process flow 500 may include the step of generating a small data classification for a plurality of data identifiers based on the important classification of the plurality of data identifiers. In some embodiments, the data classification system may generate the small data classification for the plurality of data identifiers, such that the small data classification is associated with the data identifiers comprising the important classification. By way of non-limiting example, the small data classification of the data identifiers comprising the important classification may be used to indicate which data is constantly being queried by users, and why such data may be important. In some embodiments, and based on the data comprising a small data classification, the data classification system may sort the data and associated data identifiers into a small data database such that the data may be efficiently called up and/or accessed by users of the data classification system and/or by users of the client associated with the data classification system. In this manner, the data classification system may sort and generate databases to store data based on the usage of the data itself (e.g., the high querying of the data).

As shown in block 504, the process flow 500 may include the step of generating a small data database comprising data associated with the plurality of data identifiers associated with the small data classification. In some embodiments, and based on the data classification, the data classification system may generate a database for the data, where the database may be based on the data classification of the data to be stored. For instance, the data classification system may generate a small data database to store the data associated with a data identifier that comprises a small data classification.

Thus, and in some embodiments, the small data database may comprise the data for each data identifier that comprises the small data classification such that the small data database comprises all the data having a small data classification. In some embodiments, the small data database may then be used by the data classification system for efficient and accurate recall of each of the data associated with the small data classifications. In some embodiments, and as the data classification of the data changes (e.g., data that was queried often is no longer queried often), the data classification system may dynamically update the small data database (and other such databases described herein) to remain an up-to-date storage resource of data comprising the small data classification.

FIG. 6 illustrates a process flow 600 for generating a wide data database comprising data associated with a wide data classification, in accordance with an embodiment of the invention. In some embodiments, a system (e.g., similar to one or more of the systems described herein with respect to FIGS. 1A-1C) may perform one or more of the steps of process flow 600. For example, a data classification system (e.g., the system 130 described herein with respect to FIG. 1A-1C) may perform the steps of process 600.

As shown in block 602, the process flow 600 may include the step of determining, based on the query log, a source identifier for each data identifier of the plurality of data identifiers. In some embodiments, the data classification system may determine the source identifier for the source of the data associated with each data identifier within the query log. In some embodiments, the query log may comprise the source identifier in the same row as the data identifier (e.g., whereby each row is associated with specific data associated with a singular data identifier) and the data classification system may determine the source identifier based on the query log. In some embodiments, the source identifier for the data may be indicated from the data itself (e.g., based on the data identifier of the data which may indicate a source, based on querying the data to determine the source, and/or the like).

As shown in block 604, the process flow 600 may include the step of determining, based on the query log, a target identifier for each data identifier of the plurality of data identifiers, wherein the target identifier comprises a target destination associated with the data identifier.

In some embodiments, the data classification system may determine the target identifier for each data identifier of the plurality of data identifiers based on the query log and the query request for each data identifier. In some embodiments, each query request may comprise a target request and/or target identifier for where the data should be transmitted. For instance, if a user is requesting the data associated with a data identifier be transmitted and stored in a different database than the current database the data is stored, then the target identifier may comprise the target database identifier of the query request (e.g., the different database from the current database).

In some embodiments, if the user submits a query request comprising a target identifier associated with a different database and/or storage subsystem to store the data (whereby the data is currently stored in an original database and/or storage subsystem such as the source database and/or source storage subsystem associated with the data), then the data classification system may determine the target identifier is associated with the target database and/or target storage subsystem from the query request.

As show in block 606, the process flow 600 may include the step of determining whether the source identifier and the target identifier are different for each data identifier. By way of non-limiting example, the data classification system may determine the source identifier and target identifier are different by comparing the source identifier and the target identifier. If the source identifier and the target identifier do not match, then the data classification system may determine the data has been requested (e.g., in the query request) to be sent to or transmitted to a different database and/or storage location from the previous database and/or previous storage location. In some embodiments, the source identifier may comprise the current storage location (e.g., current database and/or current storage subsystem the data is currently stored) or the source identifier may comprise the source location where the data was originally generated or stored. In this manner, the data classification system may track each location of the data as it is transmitted and/or added to different databases and/or storage subsystems.

As shown in block 608, the process flow 600 may include the step of generating, in an instance where the source identifier and target identifier are different, the important classification for the data identifier. In some embodiments, the data classification system may generate the important classification for data identifier associated with the data which comprises a different target identifier from the source identifier. In this manner, the data classification system may determine the data is likely important due to its transmission between multiple databases and/or storage subsystems.

In some embodiments, and as shown in block 610, the process flow 600 may include the step of determining, based on the important classification for the data identifier, that the important classification comprises a wide data classification, wherein the data classification is based on the determination the source identifier and the target identifier are different. In some embodiments, the data classification system may determine the important classification for the data comprises a wide data classification, where the data has been determined to have a different target identifier from the source identifier. For instance, the data classification system may determine the wide data classification based on the transmission and/or addition of data from a previous source location (e.g., such as a database, a model, a storage subsystem, and/or the like) to a new (different) target location (e.g., such as a different database, a different model, a different storage subsystem, and/or the like). Thus, and similar to the small data classification, the data classification system may determine the classification of the data based on the use of the data itself.

In some embodiments, and as shown in block 612, the process flow 600 may include the step of generating a wide data database comprising data associated with a data identifier comprising the wide data classification. In some embodiments, the data classification system may generate a wide data database for the data associated with the wide data classification. For instance, the data classification system may sort and/or store each data associated with the data identifier comprising the wide data classification such that each data and associated data identifier comprising the wide data classification is stored in the wide data database for easy, efficient, and accurate recall by the data classification system. In some embodiments, and similar to the small data database, the data classification system may dynamically update the wide data database when the data classifications of the data within the wide data database changes.

FIG. 7 illustrates a process flow 700 for determining a current data classification and a previous data classification, in accordance with an embodiment of the invention. In some embodiments, a system (e.g., similar to one or more of the systems described herein with respect to FIGS. 1A-1C) may perform one or more of the steps of process flow 700. For example, a data classification system (e.g., the system 130 described herein with respect to FIG. 1A-1C) may perform the steps of process 700.

As shown in block 702, the process flow 700 may include the step of generating a previous data identifier frequency for each data identifier based on a plurality of previous query logs comprising at least one data identifier, wherein the previous data identifier frequency comprises a previous time period. In some embodiments, the data classification system may generate the previous data identifier frequency for each data identifier, where the previous data identifier frequency may comprise an amount the data identifier has shown up in a plurality of query logs over a previous time period. For instance, the previous time period for the previous data identifier frequency may comprise the same length of time as the specified time period (e.g., previous 24-hour periods, previous month periods, previous year periods, and/or the like). In some embodiments, the previous data identifier frequency and its associated previous time period may comprise the entire amount of data identifiers for all of the query logs the data classification system may receive. In this manner, the data classification system may generate the previous data identifier frequency to show the data identifier total from the first time the data is generated and queried.

As shown in block 704, the process flow 700 may include the step of determining, based on the previous data identifier frequency, a previous data classification for the at least one data identifier. In some embodiments, the data classification system may determine, based on the previous data identifier frequency, the previous data classification for each data identifier of the at least one query log from the previous time period. By way of non-limiting example, the data classification system may determine a previous data classification in a similar manner as described above with respect to FIGS. 2, 3, and 4. For instance, and in some embodiments, the previous data classification may be based on determining whether the previous data identifier frequency for each data identifier meets at least one of a medium-important threshold and/or an importance threshold. In some embodiments, the previous data classification may be based on comparing the plurality of previous data identifier frequencies for the plurality of data identifiers to generate a previous data identifier total ranking, and then determining the previous data identifier frequency is an important classification based on the previous data identifier total ranking.

As shown in block 706, the process flow 700 may include the step of generating a current data identifier frequency based on at least one current query log comprising the at least one data identifier, wherein the current data identifier frequency comprises a current time period. In some embodiments, the data classification system may generate the current data identifier frequency based on receiving a current query log (e.g., a query log received during a current time period) and identifying or determining an amount each data identifier occurs in the current query log. In some embodiments, the current time period may comprise the same length of time as the previous time period such that the previous data identifier frequency and the current data identifier frequency comprise the same length of time (e.g., the most recent 24 hour period, the most recent week period, the most recent month period, and/or the like).

As shown in block 708, the process flow 700 may include the step of determining, based on the current data identifier frequency, a current data classification for the at least one data identifier. In some embodiments, the data classification system may determine a current data classification for each of the data identifiers of the current query log by determining, based on the current data identifier frequency, current data identifier frequency. Similar to the processes described above with respect to FIGS. 2, 3, and 4 for determining the data classification of data identifiers, the current data classification may be based on similar processes. For instance, and in some embodiments, the current data classification may be based on determining whether the current data identifier frequency for each data identifier meets at least one of a medium-important threshold and/or an importance threshold. In some embodiments, the current data classification may be based on comparing the plurality of current data identifier frequencies for the plurality of data identifiers to generate a current data identifier total ranking, and then determining the current data identifier frequency is an important classification based on the current data identifier total ranking.

In some embodiments, and as shown in block 710, the process flow 700 may include the step of determining the previous data classification and the current data classification comprise a plurality of different data classification types. In some embodiments, the data classification system may determine the previous data classification and the current data classification have changed (e.g., comprise a different classification type). For instance, the previous data classification may comprise an unimportant classification for a specific data identifier, then the current data classification may comprise an important classification. In some embodiments, and based on the different classification types between the previous data classification and the current data classification, the data classification system may determine that the data associated with the data identifier has only recently become important and an alert should be generated to alert a manager of the data classification system, a client of the data classification system, a user of the data classification system, and/or the like indicating the change in data classifications. Such a change in data classifications between the previous data classification and the current data classification may indicate a security problem, such as where the data associated with the data identifier used to be private, but now may appear to be publicly accessible.

In some embodiments, and as shown in block 712, the process flow 700 may include the step of generating, based on the previous data classification and the current data classification being different, a classification alert for the at least one data identifier. In some embodiments, the data classification system may generate a classification alert for each data identifier that comprises different classifications between the previous data classification and the current data classification. For instance, and similar to the example provided above where the previous data classification comprises an unimportant classification and the current data classification comprises an important classification, the data classification system may generate a classification alert which may comprise the previous data classification, the current data classification, the associated data identifier, and/or the like, and may be transmitted to a user device for configuring a graphical user interface of the user device in order to indicate the change in data classifications for the data identifier. In some embodiments, the user device may be a user device associated with a user of the data classification system, a user device associated with a manager of the data classification system, a user device associated with a client of the data classification system, and/or the like.

In some embodiments, and as shown in block 714, the process flow 700 may include the step of determining the previous data classification and the current data classification comprise a same data classification type. In some embodiments, the data classification system may determine the previous data classification and the current data classification comprises the same data classification type, which may indicate the frequency that the data identifier is being queried has remained at a similar rate. In some embodiments, and where the previous data classification and the current data classification has remained the same for a data identifier, the data classification system may store the current data classification with the data. In some embodiments, the data classification system may generate a classification alert for each of the data identifiers to indicate whether the data classification for the data identifiers have changed and/or remained the same.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automatically classifying data based on data usage and accessing patterns, the system comprising:
  a memory device with computer-readable program code stored thereon;
  at least one processing device operatively coupled to the at least one memory device and the at least one communication device, wherein executing the computer-readable code is configured to cause the at least one processing device to:
  receive at least one query log comprising a plurality of data identifiers;
  generate, by the at least one processing device, a data identifier total based on each data identifier of the plurality of data identifiers;
  determine, by the at least one processing device, a data classification for each data identifier based on the data identifier total, wherein the data classification comprises at least one of an important classification or an unimportant classification, wherein the data classification determination comprises:
    determining, based on the query log, a source identifier for each data identifier of the plurality of data identifiers,
    determining, based on the query log, a target identifier for each data identifier of the plurality of data identifiers, wherein the target identifier comprises a target destination associated with the data identifier,
    determining whether the source identifier and the target identifier are different for each data identifier, and
    generating, in an instance where the source identifier and target identifier are different, the important classification for the data identifier;
  generate, by the at least one processing device, a data catalogue comprising at least one data identifier associated with the important classification;
  generate, by the at least one processing device, a wide data classification for each data identifier associated with the importance classification;
  generate a wide database comprising a large volume for the data and the data identifier comprising the wide data classification, wherein the large volume comprises an attribute within the wide database for each piece of data associated with the data identifier;

automatically update, based on the wide data classification for each data identifier associated with the importance classification, the wide database with the data and the data identifier of each data identifier comprising the wide data classification, wherein the updating of the wide database comprising a storage of the data and the data identifier;

receive, at a later instance to the generation and updating of the wide database, a query comprising at least one data identifier from the plurality of data identifiers, wherein the at least one data identifier from the query is associated with the wide data classification; and automatically collect, in response to the received query, the data of the at least one identifier from the wide database.

2. The system of claim 1, wherein the processing device is further configured to:
determine the data identifier total meets an importance threshold; and
determine the data classification is the important classification, wherein data classification is based on the data identifier total meeting the importance threshold.

3. The system of claim 1, wherein the processing device is further configured to:
generate a plurality of data identifier totals, wherein each data identifier total of the plurality of data identifiers is based on each data identifier of the plurality of data identifiers;
compare the plurality of data identifier totals;
generate, based on comparing the plurality of data identifier totals, a data identifier total ranking; and
determine the data classification is the important classification based on the data identifier total ranking, wherein the important classification is associated with at least one data identifier comprising a highest data identifier total ranking.

4. The system of claim 1, wherein the processing device is further configured to:
generate a small data classification for a plurality of data identifiers based on the importance classification of the plurality of data identifiers; and
generate a small data database comprising data associated with the plurality of data identifiers associated with the small data classification.

5. The system of claim 4, wherein the importance classification for the small data classification is based on a high query rate for the plurality of data identifiers, and wherein the processing device is further configured to:
generate a small database comprising only data and data identifiers associated with the small data classification, wherein the small database comprises small data representative of the data and data identifiers associated with the small data classification;
receive, in an instance after the small database is generated, a query comprising at least one data identifier from the plurality of data identifiers that is associated with the small data classification; and
automatically collect, in response to receiving the query, the data of the at least one identifier from the small database.

6. The system of claim 1, wherein the processing device is further configured to determine, based on the important classification for the data identifier, the important classification comprises a wide data classification, wherein the wide data classification is based on the determination the source identifier and the target identifier are different.

7. The system of claim 6, wherein the processing device is further configured to generate a wide data database comprising data associated with a plurality of data identifiers associated with the wide data classification.

8. The system of claim 1, wherein the processing device is further configured to:
generate a previous data identifier frequency for each data identifier based on a plurality of previous query logs comprising at least one data identifier, wherein the previous data identifier frequency comprises a previous time period;
determine, based on the previous data identifier frequency, a previous data classification for the at least one data identifier;
generate a current data identifier frequency based on at least one current query log comprising the at least one data identifier, wherein the current data identifier frequency comprises a current time period; and
determine, based on the current data identifier frequency, a current data classification for the at least one data identifier.

9. The system of claim 8, wherein the processing device is further configured to:
determine the previous data classification and the current data classification comprise a plurality of different data classification types; and
generate, based on the previous data classification and the current data classification being different, a classification alert for the at least one data identifier.

10. The system of claim 8, wherein the processing device is further configured to determine the previous data classification and the current data classification comprise a same data classification type.

11. The computer program product of claim 1, wherein the processing device is further configured to cause the processor to determine, based on the important classification for the data identifier, the important classification comprises a wide data classification, wherein the wide data classification is based on the determination the source identifier and the target identifier are different.

12. A computer program product for automatically classifying data based on data usage and accessing patterns, wherein the computer program product comprises at least one non-transitory computer-readable medium having computer-readable program code portions embodied therein, the computer-readable program code portions which when executed by a processing device are configured to cause a processor to:
receive at least one query log comprising a plurality of data identifiers;
generate a data identifier total based on each data identifier of the plurality of data identifiers;
determine a data classification for each data identifier based on the data identifier total, wherein the data classification comprises at least one of an important classification or an unimportant classification, wherein the determination of the data classification comprises:
determining, based on the query log, a source identifier for each data identifier of the plurality of data identifiers,
determining, based on the query log, a target identifier for each data identifier of the plurality of data identifiers, wherein the target identifier comprises a target destination associated with the data identifier,
determining whether the source identifier and the target identifier are different for each data identifier, and generating, in an instance where the source identifier and target identifier are different, the important classification for the data identifier;

generate a data catalogue comprising at least one data identifier associated with the important classification;

generate a wide data classification for each data identifier associated with the importance classification;

generate a wide database comprising a large volume for the data and the data identifier comprising the wide data classification, wherein the large volume comprises an attribute within the wide database for each piece of data associated with the data identifier;

automatically update, based on the wide data classification for each data identifier associated with the importance classification, the wide database with the data and the data identifier of each data identifier comprising the wide data, wherein the updating of the wide database comprising a storage of the data and the data identifier;

receive, at a later instance to the generation and updating of the wide database, a query comprising at least one data identifier from the plurality of data identifiers, wherein the at least one data identifier from the query is associated with the wide data classification; and automatically collect, from the wide data database and in response to the received query, the data of the at least one identifier from the wide database.

13. The computer program product of claim 12, wherein the processing device is further configured to cause the processor to:

generate a plurality of data identifier totals, wherein each data identifier total of the plurality of data identifiers is based on each data identifier of the plurality of data identifiers;

compare the plurality of data identifier totals;

generate, based on comparing the plurality of data identifier totals, a data identifier total ranking; and determine the data classification is the important classification based on the data identifier total ranking, wherein the important classification is associated with at least one data identifier comprising a highest data identifier total ranking.

14. The computer program product of claim 12, wherein the processing device is further configured to cause the processor to:

generating a small data classification for a plurality of data identifiers based on the important classification of the plurality of data identifiers; and generating a small data database comprising data associated with the plurality of data identifiers associated with the small data classification.

15. A computer-implemented method for automatically classifying data based on data usage and accessing patterns, the computer-implemented method comprising:

receiving at least one query log comprising a plurality of data identifiers;

generating a data identifier total based on each data identifier of the plurality of data identifiers;

determining a data classification for each data identifier based on the data identifier total, wherein the data classification comprises at least one of an important classification or an unimportant classification, wherein the determination of the data classification comprises:

determining, based on the query log, a source identifier for each data identifier of the plurality of data identifiers, determining, based on the query log, a target identifier for each data identifier of the plurality of data identifiers, wherein the target identifier comprises a target destination associated with the data identifier, determining whether the source identifier and the target identifier are different for each data identifier, and generating, in an instance where the source identifier and target identifier are different, the important classification for the data identifier;

generating a data catalogue comprising at least one data identifier associated with the important classification;

generating a wide data classification for each data identifier associated with the importance classification;

generating a wide database comprising a large volume for the data and the data identifier comprising the wide data classification, wherein the large volume comprises an attribute within the wide database for each piece of data associated with the data identifier;

automatically updating, based on the wide data classification for each data identifier associated with the importance classification, the wide database with the data and the data identifier of each data identifier comprising the wide data classification, wherein the updating of the wide database comprising a storage of the data and the data identifier;

receiving, at a later instance to the generation and updating of the wide database, a query comprising at least one data identifier from the plurality of data identifiers, wherein the at least one data identifier from the query is associated with the wide data classification; and automatically collecting, from the wide data database and in response to the received query, the data of the at least one identifier from the wide database.

16. The computer-implemented method of claim 15, the computer-implemented method further comprising:

generating a plurality of data identifier totals, wherein each data identifier total of the plurality of data identifiers is based on each data identifier of the plurality of data identifiers;

comparing the plurality of data identifier totals;

generating, based on comparing the plurality of data identifier totals, a data identifier total ranking; and determining the data classification is the important classification based on the data identifier total ranking, wherein the important classification is associated with at least one data identifier comprising a highest data identifier total ranking.

17. The computer-implemented method of claim 15, the computer-implemented method further comprising:

generating a small data classification for a plurality of data identifiers based on the important classification of the plurality of data identifiers; and generating a small data database comprising data associated with the plurality of data identifiers associated with the small data classification.

18. The computer-implemented method of claim 15, the computer-implemented method further comprising:

determining, based on the query log, a source identifier for each data identifier of the plurality of data identifiers;

determining, based on the query log, a target identifier for each data identifier of the plurality of data identifiers, wherein the target identifier comprises a target destination associated with the data identifier;

determining whether the source identifier and the target identifier are different for each data identifier; and generating, in an instance where the source identifier and target identifier are different, the important classification for the data identifier.

19. The computer-implemented method of claim 18, wherein the computer-implemented method further comprising determining, based on the important classification for the data identifier, the important classification comprises a wide data classification, wherein the wide data classification is based on the determination the source identifier and the target identifier are different.

\* \* \* \* \*